(12) United States Patent
Celis et al.

(10) Patent No.: US 7,469,253 B2
(45) Date of Patent: Dec. 23, 2008

(54) ASSOCIATIVE HASH PARTITIONING USING PSEUDO-RANDOM NUMBER GENERATOR

(75) Inventors: Pedro Celis, Redmond, WA (US);
Lubor Kollar, Redmond, WA (US);
Shailesh Vaishnavi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 10/404,373

(22) Filed: Apr. 1, 2003

(65) Prior Publication Data

US 2004/0199533 A1  Oct. 7, 2004

(51) Int. Cl.
*G06F 7/00* (2006.01)
(52) U.S. Cl. .................. 707/101; 707/2; 707/7
(58) Field of Classification Search .......... 707/2, 707/7, 101
See application file for complete search history.

(56) References Cited

U.S. PATENT DOCUMENTS

| | | | | | |
|---|---|---|---|---|---|
| 4,179,663 | A | * | 12/1979 | Vasseur | 327/164 |
| 4,944,009 | A | * | 7/1990 | Micali et al. | 380/46 |
| 5,390,359 | A | * | 2/1995 | Damerau | 707/3 |
| 5,551,027 | A | * | 8/1996 | Choy et al. | 707/201 |
| 5,625,815 | A | * | 4/1997 | Maier et al. | 707/8 |
| 5,651,123 | A | * | 7/1997 | Nakagawa et al. | 712/208 |
| 6,115,705 | A | * | 9/2000 | Larson | 707/3 |
| 6,125,370 | A | * | 9/2000 | Courter et al. | 707/202 |
| 6,694,324 | B1 | * | 2/2004 | Shatdal | 707/102 |
| 6,931,390 | B1 | * | 8/2005 | Zait et al. | 707/2 |
| 2002/0194157 | A1 | * | 12/2002 | Zait et al. | 707/2 |

OTHER PUBLICATIONS

IEEE, "The Authoritative Dictionary of IEEE Standards Terms", Copyright 2000, Standards Information Network IEEE Press, Seventh Edition, p. 797.*
Cyran, M., Oracle9*i* Database Concepts, Release 2(9.2), Part No. A96524-01, 1996, http://www.cise.ufl.edu/help/database/oracle-docs/server.920/a96524/title.htm, 2 pages "Partitioned Tables and Indexes", Oracle9*i* Database Concepts Release 2(9.2), Part No. A96524-01, © 1996-2003 Oracle Corporation, http://www/cise.ufl.edu/help/database/oracle-docs/server.920/a96524/c12parti.htm, 15 pages.

* cited by examiner

*Primary Examiner*—Wilson Lee
*Assistant Examiner*—Michael Le
(74) *Attorney, Agent, or Firm*—Woodcock Washburn LLP

(57) ABSTRACT

Flexible and efficient partitioning of a table is accomplished by hashing the key for an entry, and determining a partition for the entry by generating a sequence of pseudo-random numbers using the hashed key as the seed. As many pseudo-random numbers are generated as there are partitions available. The partition in which the entry belongs corresponds to the largest number in the sequence generated with the hashed key and the pseudo-random number generator. In this way, repartitioning of a partitioned table with a first number of partitions to a second number of partitions can be done with minimal movement and upon repartitioning, the new partition is the same partition that that would have resulted had a new partitioning been performed with the second number of partitions.

31 Claims, 3 Drawing Sheets

Use a hash function is used to generate a bucket number from the key
200

Use the bucket number to seed the PRNG and generate a sequence of N pseudo-random numbers, $P_1, P_2 \ldots P_N$
210

Examine the sequence $P_1, P_2 \ldots P_N$ to determine which of the pseudo-random numbers $P_H$ generated is the highest in the sequence.
220

Associate the table entry with partition H.
230

FIG. 2

ASSOCIATIVE HASH PARTITIONING USING PSEUDO-RANDOM NUMBER GENERATOR

FIELD OF THE INVENTION

This invention relates to databases. More specifically, this invention relates to database partitioning systems and methods.

BACKGROUND OF THE INVENTION

A database is a collection of tables. These tables are arrays of information, where each row in the array constitutes a group of related data. For example, in an exemplary table representing bibliographic information, a first column includes author information and a second column includes title information. Other columns may also be included. Each row includes author, title, and publication date information, for example.

A table in a database may grow to be very large. If this occurs, storage and access may be difficult. A table in a database may be partitioned in order to provide more flexible storage or faster location of a row. Queries and statements on the database do not need to be modified in order to access partitioned tables, though partitions can be accessed and used separately as well. Partitions will be of a smaller size than the original table, and therefore partitioning simplifies the manageability of large database objects.

When a table is partitioned, the partitioning is done with a partition function. A key, related to the information in one or more columns of a row, is used as the input to the function. The output of the function is used to determine the partition in which the row should be found. Where there are N partitions, the partition function is a way to take the key for the row, and determine which partition (of partitions 1 through N) the row belongs in, based on the key.

For example, for a table with bibliographic information, the partition function may divide the rows into groups. In one example, the key may be the entry in the author's name column. Where there are 5 partitions, the partition function may place rows where the author's name begins with A through E in partition 1, F through I in partition 2, J through N in partition 3, O through S in partition 4, and T through Z in partition 5. Because this partition function breaks key values into ranges, this is known as range partitioning.

Where a hash function is used as the partition function, hash partitioning is achieved. Hash partitioning enables easy partitioning of data that does not lend itself to range partitioning. It is useful, for example, when it is not clear how much data will map into a given range or where range partitioning causes undesirable clustering. A hash function allows a mapping from the set of keys (for example, author's names) to the set of partitions (1 through N) with approximately equal distribution of partition assignments. The hash function is used to determine the partition for a given key, and in this way, the entry is assigned a partition. The resulting roughly equal distribution of entries over the partitions, so that approximately 1/N of the entries in each of N partitions, is desirable, in order to maximize the usefulness of partitioning the table.

In addition to a roughly equal distribution, when performing a partition, there are several other desirable characteristics of the partitioning. First, collocation is desirable. Where two tables T1 and T2 are partitioned, these tables are collocated if they have the same number of partitions and if there exists one-to-one correspondence between the partitions of T1 and T2. That is, if there are two rows, R1 in T1 and R2 in T2, and both R1 and R2 have the same key, then if R1 is in the Mth partition of T1, R2 should be in the Mth partition of T2. This allows efficiencies in searching. For example, T1 may be the bibliographic table mentioned above, with author, title and publishing date. T2 may be a list of author contact information, with author's name and author address. If T1 and T2 are both partitioned on the author's name and are collocated, then a search to find all authors listed in T1 and T2 will need to compare the entries in partition 1 of T1 with those in partition 1 of T2, the entries in partition 2 of T1 with those in partition 2 of T2, etc. Where there are N partitions, N pairs of partitions need to be searched. However, if T1 and T2 are not collocated, the entries in partition 1 of T1 would have to be compared with the entries in all partitions of T2, the entries in partition 2 of T1 would have to be compared with the entries in all partitions of T2, etc. Thus $N^2$ pairs of partitions need to be searched. Thus, collocation reduces the necessary matching. As the number of partitions increases, this benefit is magnified.

As another example, two tables exist with employee data, with the first table including entries including an employee ID and an employee name, and the second table including the employee ID and an employer name, and it is desired to find the name of an employer for a given named employee. The tables are partitioned on employee ID. First, all the partitions in the first table would need be searched to find the employee name. This is because the partition is based on employee ID, not employee name. When the correct name is found, the employee ID can be used to look in the second table for the employer's name. If the first and second tables are collocated, and the employee's name was found in partition M of the first table, then the hash of the employee ID need not be performed. If an entry exists in the second table for that employee ID, it will be contained in partition M of the second table. Thus, a savings in calculating the hash of the key is realized.

An additional desirable characteristic of partitioning is minimal data movement when adding and removing partitions. For example, a hash to four buckets may be used to spread a table across 4 partitions. This may be done in order to use four available storage devices. If an additional storage device is obtained, it may be desirable to implement 5 partitions. This may be done with a new hash function. It is desirable to create a new partition in such a way that an entry either remains in its original partition in the 4-partition or moves to the new partition. In this way, there will be minimal movement necessary to implement the new partition—only the entries being switched from their old partition to the newly created partition need to move. If there is roughly uniform distribution between the partitions, this means that adding a new partition will bring the total number of partitions to N, only approximately 1/N of the entries need to be moved in order to implement the new partition. The minimal amount of data should be moved to have an approximately even distribution even where more than one partition is being added. Similarly, if the new partitioning is to a smaller number of partitions, only entries in the eliminated partitions should be moved.

If, for example, the range partition described above with 5 partitions, where keys starting A through E are placed in partition 1, F through I in partition 2, J through N in partition 3, O through S in partition 4, and T through Z in partition 5 were repartitioned to 6 partitions, a new partition might be: A through D in partition 1, E through G in partition 2, H through L in partition 3, M through Q in partition 4, R through U in partition 5, and V through Z in partition 6. However, this likely moves more than ⅙ of the entries, since in addition to entries moving to partition 6, entries move from partition 1 to 2, from 2 to 3, from 3 to 4, etc. A range partition might be repartitioned with minimal movement, in our example, this might be done by a partition that moves entries starting with E, I, N, S, and Z to the new partition. However, this creates a more complex algorithm for determining partitions (which might become increasingly complex as partitions are added and deleted) and does not display another desirable characteristic of partitioning: associativity.

Associativity of hash partitioning is achieved when changes in the number of partitions does not change the resulting partition. For example, if a table is originally partitioned into Q partitions, and a new partitioning of the table into R partitions is made, the partition is associative if the new partitioning is the same partition that would have occurred if the table had originally partitioned into R partitions. This should be true whether Q>R or Q<R, in other words, whether one or more partitions have been added whether one or more partitions have been removed. If a partitioning is associative, then where two tables are partitioned on the same key into different numbers of partitions, repartitioning one table will produce a collocated partitioning. Thus processing advantages are realized.

While each of these desirable characteristics of collocation, minimal data movement, and associativity is individually present in prior art partitioning systems and methods, there is a need for a partitioning system and method which displays all of these characteristics. For example, as discussed above, a range repartition which produces minimal data movement is not associative. Similarly, no prior art hash function produces both minimal data movement and associativity.

Thus, there is a need for a method and system for hash partitioning with characteristics including collocation, minimal data movement, and associativity that overcomes the drawbacks in the prior art.

SUMMARY OF THE INVENTION

The present invention is directed to hash partitioning in which the value of the partition key for an entry is used to seed a random number generator which is then used to generate a sequence of N pseudo-random numbers, where N is the number of partitions. The partition that the entry is assigned to is determined by the position of the largest of the N pseudo-random numbers in the sequence.

Such hash partitioning will allow collocation of table partitions, minimal data movement, and associativity, and will ensure a roughly equal distribution of entries among the partitions.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is a flow diagram representing a method of implementing associative hash partitioning according to the present invention.

DETAILED DESCRIPTION OF ILLUSTRATIVE EMBODIMENTS

Overview

In order to provide hash partitioning that is associative and has minimal movement during repartitions, a pseudo-random number generator is used.

Where there are N partitions, the partitions are numbered 1 through N, the correct partition for an entry is determined by using the key for the entry as a seed to a pseudo-random number generator. A sequence of N pseudo-random numbers, $P_1$ through $P_N$ is generated. The highest number of this sequence, $P_H$ is identified, and the correct partition for the entry is partition H.

In this way, a partition is achieved which is associative over repartitionings and which requires minimal movement for repartitionings. Collocation is also achieved.

Exemplary Computing Device

Figure 1:
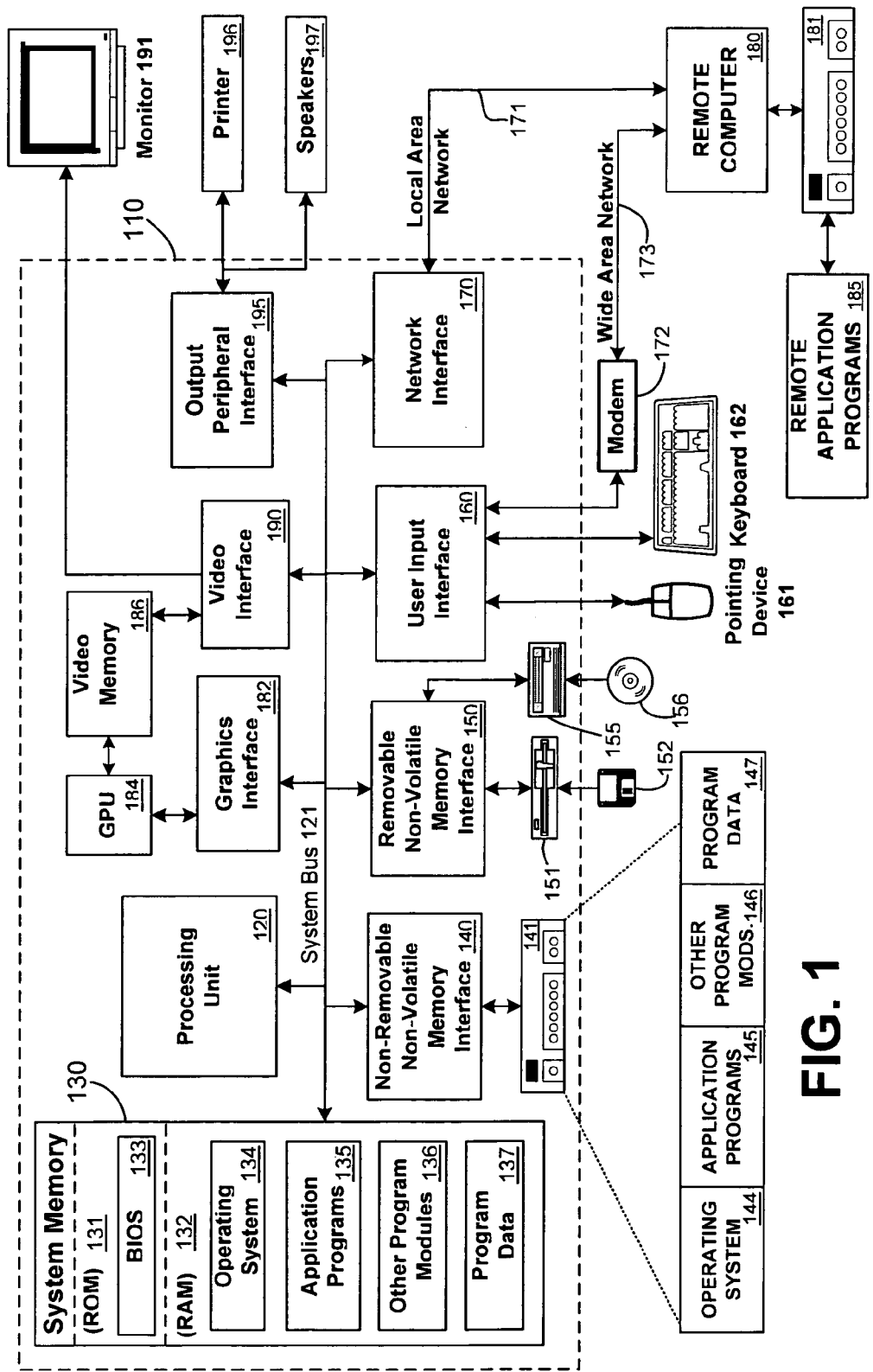
FIG. 1 is a block diagram representing an exemplary non-limiting computing system in which the present invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer con urations. Other well known computing systems, environments, and/or con urations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer system 110. A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Associative Hash Partitioning

In order to accomplish associative hash partitioning, a pseudo-random number generator is desirably used. True random numbers are non-deterministic. Computers however, are deterministic by nature, and therefore random number generation by computer has been difficult to accomplish. Instead, a pseudo-random number generator (PRNG) is often used. A PRNG uses a deterministic algorithm to generate a sequence of numbers with little or no discernable pattern in the numbers, except for broad statistical patterns including approximately equal distribution of generated numbers over the range of possible numbers.

In a PRNG, a seed is often used to initiate number generation. In order to obtain pseudo-random numbers, in some contexts the seed is taken from the time or from a user input such as the movement of a mouse. If the same seed is used twice, the same sequence of numbers will be output.

FIG. 2 is a flow diagram representing a method of implementing associative hash partitioning according to the present invention. As shown in FIG. 2, in order to determine the partition for a table entry, where there are N partitions numbered 1 through N, a sequence of N pseudo-random numbers, $P_1, P_2, \ldots P_N$ is generated, using the key for the table entry as a seed. In one embodiment, as seen in step 200, a hash function is used to generate a bucket number from 1 to B from the key. For example, the hash function may be used to hash author's names into one of 16384 ($2^{14}$) buckets. Then this bucket number is used to seed PRNG, which is used to generate a sequence of N pseudo-random numbers, step 210. In alternate embodiments, the key is used directly as a seed, or some other function is used on the key to produce a seed for the PRNG.

In step 220, the sequence $P_1, P_2 \ldots P_N$ is examined to determine the position of a number with a specific attribute in the sequence with a predetermined attribute. For example, the attribute might be the highest number in the sequence, the lowest number in the sequence the second highest number in the sequence, the number in the sequence closest to a pre-specified number, the number in the sequence with the most bits when written in binary notation, etc. In one embodiment, the sequence is examined to determine which of the pseudo-random numbers $P_H$ generated is the highest in the sequence. In step 230, the table entry is associated with partition H. For example, where 5 partitions are being used, as shown in Table 1, the key (e.g. author's name) is used to produce a bucket. The bucket is then used to produce a sequence of 5 pseudo-random numbers from 1 to 200.

TABLE 1

Example of Assignment of Partition with 5 Partitions

| Key (author's name) | Hash of the key (bucket) | Sequence of pseudo-random numbers | Partition for entry |
|---|---|---|---|
| "Douglas Adams" | 2303 | 127, 48, 12, 173, 50 | 4 |
| "Jane Austen" | 32 | 112, 190, 25, 178, 35 | 2 |
| "Dan Bern" | 13210 | 75, 122, 158, 70, 195 | 5 |
| "John Steinbeck" | 3923 | 32, 55, 103, 155, 99 | 4 |

For example, for the first entry, the key "Douglas Adams" is hashed to a value of 2303. This bucket number is used to seed the PRNG. Five pseudo-random numbers are then generated in sequence. The fourth of these numbers is the highest number in the series. Therefore, the entry is associated with partition 4. If the entry is being added to the partitioned table, for example, it should be added in partition 4. If an attempt is being made to locate the entry in the partitioned table, it should be searched for in partition 4. Because the PRNG produces numbers with no discernable pattern, in roughly one fifth of the cases the first number will be the highest, in roughly one fifth the second number in the sequence will be the highest, etc. In the general case, for N partitions, roughly 1/N of the total number of entries will be assigned to each partition. Thus equal distribution of the entries among the partitions is achieved.

If the table is to be repartitioned, the same steps are desireably followed. For example, Table 2 shows the repartitioning of the above table into 4 partitions:

TABLE 2

Example of Assignment of Partition with 4 Partitions

| Key (author's name) | Hash of the key (bucket) | Sequence of pseudo-random numbers | Partition for entry |
|---|---|---|---|
| "Douglas Adams" | 2303 | 127, 48, 12, 173 | 4 |
| "Jane Austen" | 32 | 112, 190, 25, 178 | 2 |
| "Dan Bern" | 13210 | 75, 122, 158, 70 | 3 |
| "John Steinbeck" | 3923 | 32, 55, 103, 155 | 4 |

As can be seen from Table 2, only the third entry is reassigned. This is because the same seed is used in the PRNG, and therefore the sequences are the same as before, but truncated by one value. If, as in the first entry, the fourth number in the sequence of five pseudo-random numbers, then the fourth number will be higher even in the shorter sequence of the first four of those five pseudo-random numbers. Only where the fifth number in the sequence was the highest number (as was the case in the third entry) will the partition change. In roughly a quarter of those cases, the first number in the sequence will now be the highest number, in roughly a quarter the second number in the sequence will now be the highest number, etc. Thus; the only entries reassigned are those in the fifth partition, and they are reassigned in roughly equal amounts to the four remaining partitions. Thus even distribution among the partitions is maintained and the minimal number of moves necessary to maintain such an even distribution are made.

Where there are N partitions, and the repartitioning will have N' partitions, and where partitions are being removed (so N>N'), then the number of moves will be approximately (N−N')/N*100 percent of the entries. Where partitions are being added (so N<N'), then the number of moves will be approximately (N'−N)/N'*100 percent of the entries.

As mentioned, partitions may also be added. For example, Table 3 shows the repartitioning of the entries into 7 partitions:

TABLE 3

Example of Assignment of Partition with 6 Partitions

| Key (author's name) | Hash of the key (bucket) | Sequence of pseudo-random numbers | Partition for entry |
| --- | --- | --- | --- |
| "Douglas Adams" | 2303 | 127, 48, 12, 173, 50, 3, 140 | 4 |
| "Jane Austen" | 32 | 112, 190, 25, 178, 35, 18, 39 | 2 |
| "Dan Bern" | 13210 | 75, 122, 158, 70, 195, 33, 130 | 5 |
| "John Steinbeck" | 3923 | 32, 55, 103, 155, 99, 180, 2 | 6 |

When partitions are added, extra numbers are generated in each sequence, but the beginning of the sequence remains the same, as the same seed is being used to generate the pseudo-random numbers. Only those entries for which a number higher than the original high number in the sequence is generated in the extra numbers in the sequence will be assigned a new partition. Thus minimal movement is again accomplished.

Because the PRNG is deterministic and the seed for the PRNG is obtained in a deterministic way (either directly from the key or through a deterministic hash, for example), if the same key is used in two different tables, the tables will be collocated if partitioned into the same number of partitions. Any entry found in both will have the same key, and therefore the same seed for the PRNG, and therefore the same partition number. The association of an entry with a partition is independent of previous associations of said table entry with a partition, and so associativity of paritioning is achieved.

Thus, partitioning is accomplished which provides a roughly equal distribution into partitions, which is associative in repartitioning, collocates entries with the same key, and which only uses minimal movements for repartitioning.

In an exemplary embodiment, where the highest number in the sequence of pseudo-random numbers occurs more than once, the table entry is preferably associated with the partition corresponding to the first occurrence of that number in the sequence. In this way, if, for example, the second and fifth numbers in the sequence of pseudo-random numbers is equal to H, which is the highest number in the sequence, then the entry will be placed in the second partition. If the table is subsequently repartitioned into fewer than five partitions (but more than two partitions), no change will need to be made for that entry. In an alternate embodiment, where the highest number in the sequence of pseudo-random numbers occurs more than once, the last occurrence of the number in that sequence is used.

Figure 3:
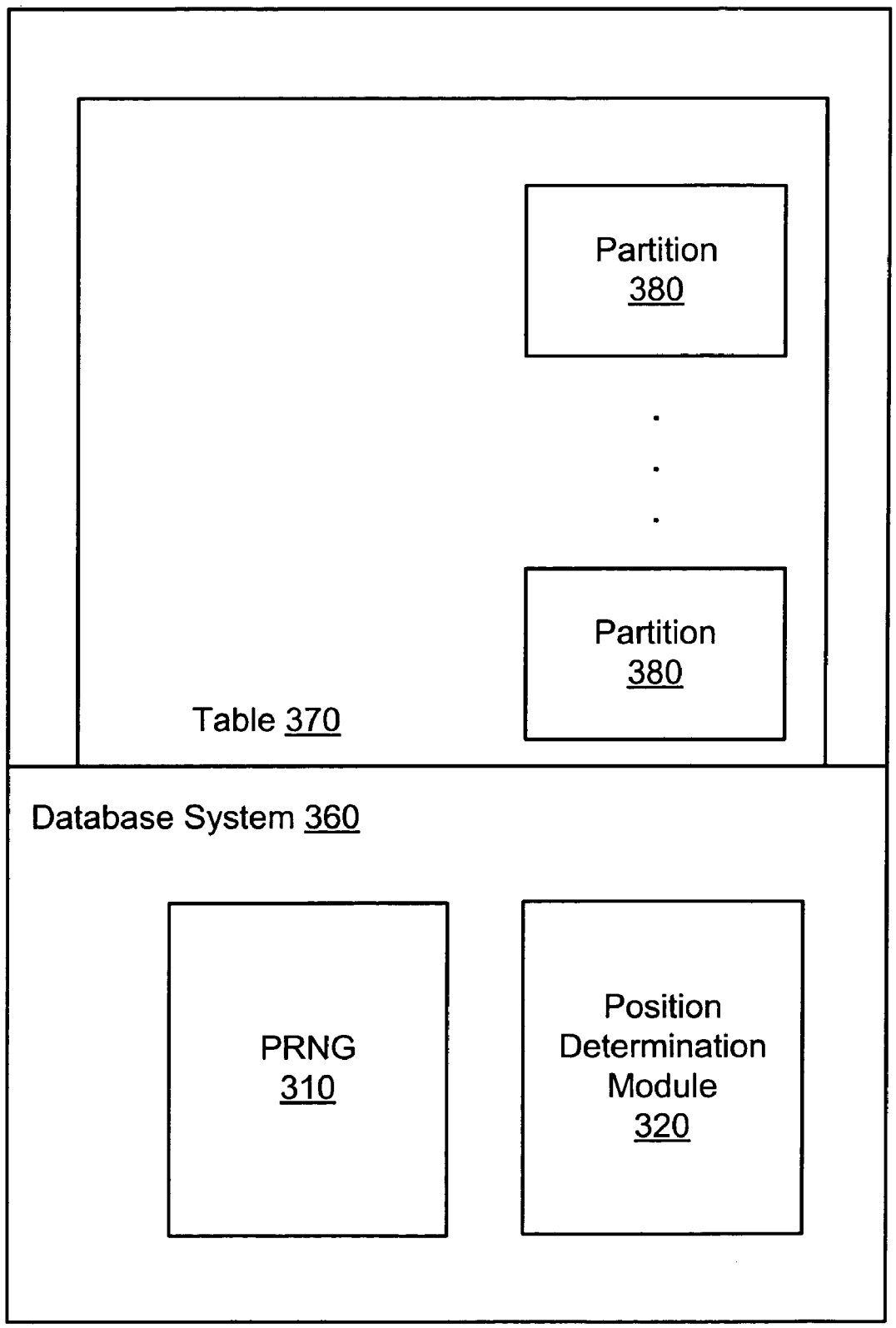
FIG. 3 is a block diagram representing a database system according to one embodiment of the invention.

An exemplary system is shown in FIG. 3. A database system 360 includes a table 370 which has been partitioned into partitions 380. These partitions may be located in one storage unit, or may be distributed over a number of storage elements. A system according to the invention may be integrated into the database system or not so integrated. In a system according to an embodiment of the present invention, a pseudo-random number generator 310 generates a sequence of N pseudo-random numbers using the key for a table entry as a seed. A position determination module 320 examines the sequence and determines the position of the highest number in the sequence. Where a search has been initiated to find the table entry, a request is made to the database system 360 to search in the partition from among partitions 380 corresponding to the position of the highest number in the sequence. Where the table entry is to be added to the table 370, a request is made to the database system 360 to add the table entry into the partition from among partitions 380 corresponding to the position of the highest number in the sequence.

CONCLUSION

As mentioned above, while exemplary embodiments of the present invention have been described in connection with various computing devices and network architectures, the underlying concepts may be applied to any computing device or system in which it is desirable to implement hash partitioning. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for associating a table entry with a partition from among N partitions, wherein N is an integer, the method comprising:
generating a sequence of N pseudo-random numbers using a key of a table entry;
determining a position of a number with a specific attribute in said sequence; and
associating said table entry with a partition corresponding to said position, with each of said N partitions comprising a plurality of table entries.

2. The method of claim 1, where said step of generating a sequence of N pseudo-random numbers using said key comprises:
using said key as a seed in a pseudo-random number generator.

3. The method of claim 1, where said step of generating a sequence of N pseudo-random numbers using said key comprises:
using a hash function on said key to produce a bucket number for said key; and
using said bucket number as a seed in a pseudo-random number generator.

4. The method of claim 1, wherein said step of associating said table entry with a partition corresponding to said position provides collocation of said table entry in a table with a second table entry comprising a second key if said key and said second key are equivalent.

5. The method of claim 1, wherein said association of said table entry with a partition corresponding to said position is independent of previous associations of said table entry with a partition.

6. The method of claim 1, wherein said number with said specific attribute comprises the highest number in said sequence.

7. The method of claim 6 where said step of determining a position of a number with a specific attribute in said sequence comprises:
determining that the highest number in said sequence occurs in a first occurrence in said sequence and a second occurrence in said sequence; and
where the one of said first occurrence and said second occurrence which is closer to the beginning of said sequence is used as said position.

8. The method of claim 1, wherein said number with said specific attribute comprises the lowest number in said sequence.

9. A computer readable storage medium having stored thereon a plurality of computer-executable instructions for associating a table entry with a partition from among N partitions, wherein N is an integer by performing the steps of:
generating a sequence of N pseudo-random numbers using a key of a table entry, wherein N is an integer;
determining a position of a number with a specific attribute in said sequence; and
associating said table entry with a partition corresponding to said position, with each of said N partitions comprising a plurality of table entries.

10. A method for adding a table entry to a table comprising N partitions, where N is an integer greater than 1, said table entry comprising a key, said method comprising:
generating a sequence of N pseudo-random numbers using said key in a pseudo-random number generator;
using a specific attribute of a number in the generated sequence for selecting said number from amongst the numbers in the generated sequence;
determining a position of the selected number in said sequence; and
adding said table entry to a partition from among said N partitions, said partition numerically corresponding to said position, wherein each of said N partitions comprises a plurality of table entries.

11. The method of claim 10, where said step of generating a sequence of N pseudo-random numbers using said key comprises:
using said key as a seed in a pseudo-random number generator.

12. The method of claim 10, where said step of generating a sequence of N pseudo-random numbers using said key comprises:
using a hash function on said key to produce a bucket number for said key; and
using said bucket number as a seed in a pseudo-random number generator.

13. A method for searching for a table entry in a table comprising N partitions, where N is an integer greater than 1, said table entry comprising a key, said method comprising:
generating a sequence of N pseudo-random numbers using said key in a pseudo-random number generator;
using a specific attribute of a number in the generated sequence for selecting said number from amongst the numbers in the generated sequence;
determining a position M of the selected number in said sequence, wherein M is in a range from 1 to N; and
searching for said table entry in a partition corresponding to said position M, from among said N partitions, each of said N partitions comprising a plurality of table entries.

14. The method of claim 13, where said step of generating a sequence of N pseudo-random numbers using said key comprises:
using said key as a seed in a pseudo-random number generator.

15. The method of claim 13, where said step of generating a sequence of N pseudo-random numbers using said key comprises:
using a hash function on said key to produce a bucket number for said key; and
using said bucket number as a seed in a pseudo-random number generator.

16. A method for associating a first table with a second table, the method comprising:
generating a sequence of N pseudo-random numbers using a key of a table entry, wherein N is an integer;
determining a position of a number with a specific attribute in said sequence;
associating said table entry with a first partition corresponding to said position, the first partition corresponding to said first table; and
associating said table entry with a second partition corresponding to said position, the second partition corresponding to said second table, whereby using the same said position for the two associating steps, provides associativity between said first and second tables.

17. The method of claim 16, where said step of generating a sequence of N pseudo-random numbers using said key comprises:
using said key as a seed in a pseudo-random number generator.

18. The method of claim 16, where said step of generating a sequence of N pseudo-random numbers using said key comprises:
    using a hash function on said key to produce a bucket number for said key; and
    using said bucket number as a seed in a pseudo-random number generator.

19. A system implemented at least in part by a computing device for partitioning a table into N partitions, wherein N is an integer, said system comprising:
    a storage device storing thereon a pseudo-random number generator for generating a sequence of N pseudo-random numbers using a key of a table entry;
    a number position determination module for determining a position in said sequence of a number having a predetermined attribute; and
    a processor configured to execute the pseudo-random number generator and the number position determination module, said processor further configured for associating said table entry with a partition numerically corresponding to said position, with each of said N partitions comprising a plurality of table entries.

20. The system of claim 19, where said number position determination module determines if the highest number in said sequence occurs in a first occurrence in said sequence and a second occurrence in said sequence, and, if so, uses the one of said first occurrence and said second occurrence which is closer to the beginning of said sequence as said position.

21. The system of claim 19, where said pseudo-random number generator for generating a sequence of N pseudo-random numbers uses said key directly as a seed in said pseudo-random number generator.

22. The system of claim 19, where said pseudo-random number generator for generating a sequence of N pseudo-random numbers uses a hashed version of said key as a seed in said pseudo-random number generator.

23. A system implemented at least in part by a computing device for adding a table entry to a table comprising N partitions, where N is an integer greater than 1, said table entry comprising a key, said system comprising:
    a storage device storing thereon a pseudo-random number generator for generating a sequence of N pseudo-random numbers using said key;
    a number position determination module for determining a position in said sequence of a number having a predetermined attribute;
    an entry addition module for initiating the addition of said table entry to a partition from among said N partitions, said partition numerically corresponding to said position, with each of said N partitions comprising a plurality of table entries; and
    a processor configured to execute the pseudo-random number generator, the number position determination module, and the entry addition module.

24. The system of claim 23, where said pseudo-random number generator for generating a sequence of N pseudo-random numbers uses said key directly as a seed in said pseudo-random number generator.

25. The system of claim 23, where said pseudo-random number generator for generating a sequence of N pseudo-random numbers uses a hashed version of said key as a seed in said pseudo-random number generator.

26. A system implemented at least in part by a computing device for searching for a table entry to a table comprising N partitions, where N is an integer greater than 1, said table entry comprising a key, said system comprising:
    a storage device storing thereon a pseudo-random number generator for generating a sequence of N pseudo-random numbers using said key;
    a number position determination module for determining a position in said sequence of a number having a predetermined attribute;
    a partition search module for initiating a search in a partition from among said N partitions corresponding to said position for said table entry, with each of said N partitions comprising a plurality of table entries; and
    a processor configured to execute the pseudo-random number generator, the number position determination module, and the partition search module.

27. The system of claim 26, where said pseudo-random number generator for generating a sequence of N pseudo-random numbers uses said key directly as a seed in said pseudo-random number generator.

28. The system of claim 26, where said pseudo-random number generator for generating a sequence of N pseudo-random numbers uses a hashed version of said key as a seed in said pseudo-random number generator.

29. A system implemented at least in part by a computing device for moving one or more table entries from M partitions to N partitions, where M and N are each integers greater than 1, each of said table entries comprising an associated key and each of said table entries associated with a partition from among M partitions, said system comprising:
    a storage device storing thereon a pseudo-random number generator for, for each of said table entries, generating a sequence of N pseudo-random numbers using said associated key;
    a number position determination module for determining a position in said sequence of a number having a predetermined attribute;
    a table entry move module for, for each of said table entries, moving said table entry to a partition from among said N partitions corresponding to said position for said table entry if said table entry is not already associated with said partition from among said M partitions corresponding to said position for said table entry, with each partition in said N partitions and said M partitions comprising a plurality of table entries; and
    a processor configured to execute the pseudo-random number generator, the number position determination module, and the table entry move module.

30. The system of claim 29, where said pseudo-random number generator for generating a sequence of N pseudo-random numbers uses said associated key directly as a seed in said pseudo-random number generator.

31. The system of claim 29, where said pseudo-random number generator for generating a sequence of N pseudo-random numbers uses a hashed version of said associated key as a seed in said pseudo-random number generator.

* * * * *